April 27, 1965     F. F. OHNTRUP     3,180,064
ULTRASONIC TOOL
Filed Nov. 13, 1962
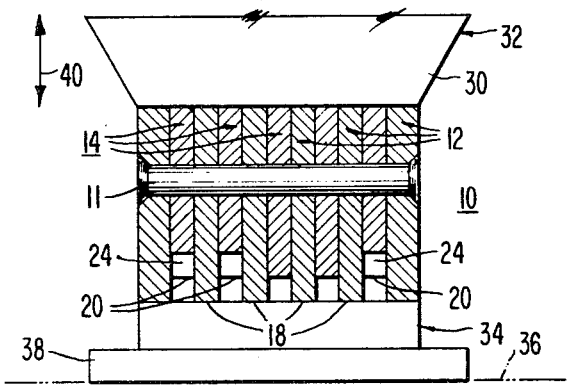
Fig.2
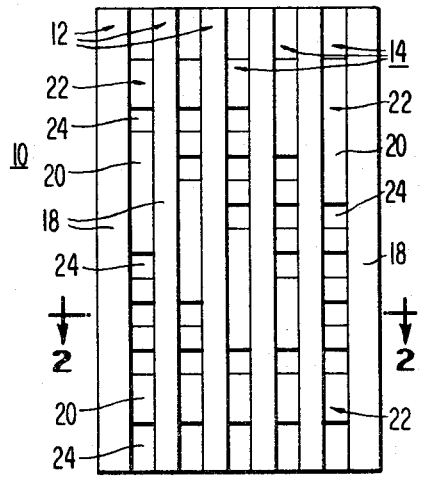
Fig.1
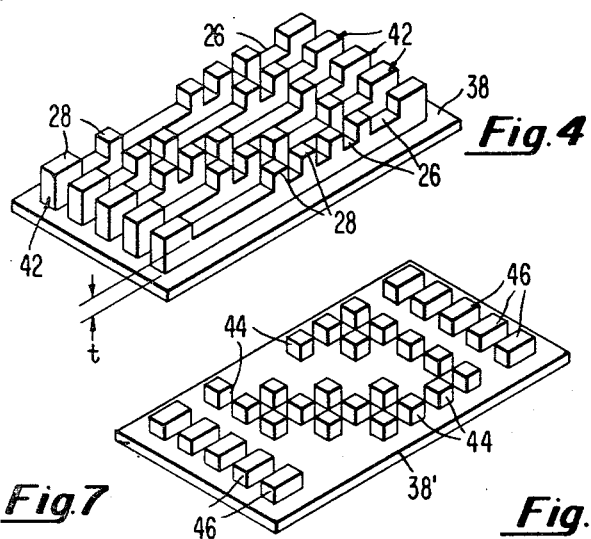
Fig.4
Fig.7
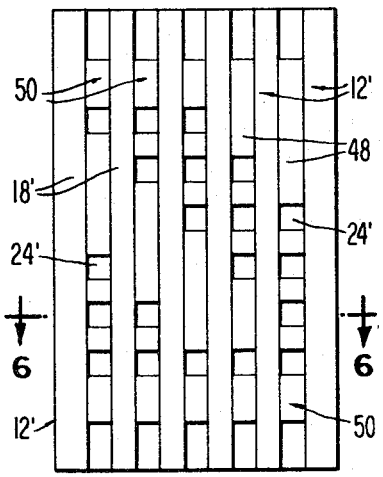
Fig.5
Fig.6
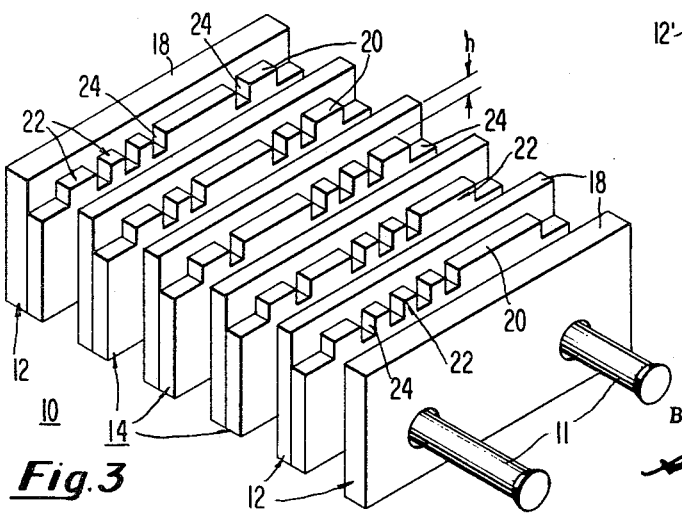
Fig.3
INVENTOR.
FREDERICK F. OHNTRUP
BY Samuel Kane
ATTORNEY United States Patent Office 3,180,064
Patented Apr. 27, 1965

3,180,064
ULTRASONIC TOOL
Frederick F. Ohntrup, Plymouth Meeting, Pa., assignor to Burroughs Corporation, Detroit, Mich., a corporation of Michigan
Filed Nov. 13, 1962, Ser. No. 237,187
9 Claims. (Cl. 51—204)

This invention relates generally to apparatus for ultrasonically machining material, and more particularly to ultrasonic cutting or shaping tools for dividing relatively large size material into smaller pieces and shaping such pieces into strips, blocks, etc.

In the process of ultrasonic machining, high frequency energy is used and a slurry of abrasive material is applied between the cutting or shaping tool and the workpiece, thereby providing vibratory abrasion and producing very fine detail in the finished workpiece. However, because of the abrasive nature of the cutting action, tools of this kind must be formed with utmost precision to avoid undue wear, particularly, where the patterns to be machined in the workpiece are complex.

An object of the invention, therefore, is to provide an ultrasonic cutting or shaping tool which will facilitate cutting material into complex patterns.

Another object of the invention is the provision of a fabricated construction for ultrasonic tools whereby they may be readily provided with precision cutting edges.

Another object of the invention is the provision of an ultrasonic cutting or shaping tool for cutting strips or other shapes from hard material and simultaneously shaping the strips to predetermined configurations.

A more specific object of the invention is the provision of a cutting tool for severing strips from semiconductor sheet material such as silicon, for example, and shaping or cutting the strips into a silicon diode matrix.

Another object of the invention is to provide an ultrasonic tool for dividing a sheet of material into strips and for simultaneously cutting each strip into a number of pieces.

A further object of the invention is to provide an ultrasonic cutting or shaping tool which is simple to fabricate and inexpensive to manufacture.

In accordance with the above objectives, and considered first in its broad aspects, the invention comprehends the use of a plurality of cutter elements for severing pieces from a layer or sheet of material, and additional cutters for shaping the pieces of material as they are being severed. In a variation of the invention, the additional cutters are constructed to cut the pieces into smaller pieces as they are being severed from the sheet.

The invention will be more clearly understood when the following detailed description of specific embodiments thereof is read in conjunction with the accompanying drawings, in which:

FIG. 1 is a bottom view of an ultrasonic cutting or shaping tool constructed in accordance with the invention;

FIG. 2 is a sectional view taken along line 2—2 of FIG. 1 and showing also the spindle and work-supporting surface of an ultrasonic machine, together with a substrate carrying a workpiece blank to be machined thereon;

FIG. 3 is an isometric exploded or separated view of the tool, shown inverted from its position in FIG. 2;

FIG. 4 is an isometric view of the finished workpiece, ultrasonically machined on the substrate by the tool of FIG. 2;

FIG. 5 is a bottom view, similar to FIG. 1, of a modification of the tool;

FIG. 6 is a fragmentary sectional view taken along line 6—6 of FIG. 5; and,

FIG. 7 is an isometric view of finished workpieces, ultrasonically cut or shaped, from a layer of material on a substrate, by the tool of FIG. 5.

Turning now to the detailed description of the illustrated embodiments, and first with respect to FIGS. 1, 2 and 3 of the drawings, which show one of the preferred forms of the invention, it is seen that the ultrasonic cutting or shaping tool is made up of a pack or bundle 10 of cutter blades which are appropriately shaped, and which are held together in alignment in any suitable manner, as by rivets 11.

The cutter elements or blades include slicing blades 12 which are rectangular in shape, as shown, and a group of generally rectangular mesa cutting blades 14 interposed alternately between the slicer blades 12. The mesa cutting blades 14 are so-called because they cut or shape plateau-like projections or mesas on the workpiece, as will appear more clearly hereinafter.

The rectangular end cutting faces 18 of the slicing blades 12 are co-planar, and the end cutting faces 20 of the mesa cutting blades 14 are recessed out of the plane of the cutting faces 18 by a distance $h$ (FIG. 3), corresponding to the paritcular desired thickness $t$ of the workpiece, as shown in FIG. 4. Each of the mesa cutting blades is provided with teeth or projections 22 which, in the present embodiment, are formed by cutting notches 24 transversely through the blade. The mesa cutter teeth 22 serve to form or machine the spaces 26 in the workpiece (FIG. 4), while the notches 24 in the mesa cutters 14 define or correspond to the workpiece projections or mesas 28, as is evident from an inspection of FIGS. 3 and 4.

The unitary assembly or bundle 10 of slicing blades 12 and mesa blades 14 is secured to the work spindle 30 of an ultrasonic machine tool 32, illustrated diagrammatically (FIG. 2), in any suitable manner, as by brazing, for example, preparatory to the operation of cutting or shaping a workpiece 34, which may be a layer or sheet of silicon diode material, for example. The workpiece 34 may be secured to the table or work-supporting surface 36 of the ultrasonic machine tool 32 in any suitable manner as required, however, for purposes of illustration, it is regarded herein as cemented or otherwise bonded to a substrate 38, which may be glass, and the substrate held or clamped to the table 36 in any suitable manner, not shown.

The spindle 30 with the tool pack 10 thereon is then brought into close proximity to the workpiece 34, as shown in FIG. 2, and subjected to high frequency vibrating energy in the direction indicated by the double arrow 40, and at the same time given a feeding movement into the workpiece, while an abrasive slurry is directed on to the tool and workpiece. When the cutting faces 18 of the slicing blades 12 have entirely cut through the workpiece 34 down to the substrate 38, the workpiece will be completely formed and will be in the shape shown in FIG. 4. As shown therein, the workpiece has been cut or machined into a number of elongated strips 42 by the slicing blades 12, and each strip has been sculptured or shaped by one of the mesa cutting blades 14 thereby providing it with mesas 28.

The completed workpiece, as shown in FIG. 4, comprising the several strips 42, may be permitted to remain bonded to the substrate 38 to provide, as illustrated in this embodiment, a silicon diode matrix in which each mesa 28 provides a junction or connection point; or, the several strips 42 may be removed from the substrate 38, if desired, for independent or other use employing a different arrangement.

The modification of the invention shown in FIGS. 5 and 6 is another preferred form and provides an ultrasonic cutting tool for dicing or cutting a workpiece into small pieces, in this case into the small rectangular blocks 44 and 46 (FIG. 7), each of which may be destined to become a semiconductor diode, a part of a transistor, and the like.

As shown most clearly in FIG. 6, the end cutting faces 48 of the mesa cutting blades 50 are preferably flush or co-planar with the end cutting faces 18' of the slicing blades 12'.

It will be clear, therefore, that when the modified tool of FIG. 5 is fed into a workpiece on a substrate 38' (FIG. 7), similar to the workpiece 34, in a manner similar to that described above for the tool of FIG. 2, until the cutting faces 48 and 18' entirely pass through the workpiece down to the substrate, there will be provided a large number of the diced units or blocks 44 and 46. With the modified tool the workpiece is cut in one direction by the slicing blades 12' to provide individual strips, and each of these strips is cut clear through, simultaneously, by the mesa cutters 50, into the smaller pieces 44 and 46.

While there have been disclosed specific structures exemplary of the principles of the invention, it is to be understood that these are but two specific forms thereof and that the invention may be constructed in a variety of shapes, sizes and modifications without departing from its true spirit and scope. Accordingly, it is to be understood that the invention is not to be limited by the specific structures disclosed, but only by the subjoined claims.

What is claimed is:

1. In an ultrasonic cutting machine, cutting tool means for abrasively cutting hard semi-conductor material by use of high frequency vibratory impact of the tool cutting end on an abrasive slurry applied between the tool cutting end and the material, said cutting tool means comprising, a plurality of flat slicing blades constructed for ultrasonic cutting and provided with rectangular cutting ends and arranged in spaced apart side-by-side relation for cutting parallel strips of said semi-conductor material from a sheet, a plurality of flat mesa cutting blades constructed for ultrasonic cutting and each arranged between adjacent ones of said slicing blades and provided with a toothed cutting end recessed behind the cutting ends of said slicing blades for simultaneously cutting a plurality of spaced apart mesas on a said strip of semi-conductor material, and means aligning and holding said blades together in abutting relation in a pack.

2. In an ultrasonic cutting machine, cutting tool means for abrasively cutting hard material by use of high frequency vibratory impact of the tool cutting end on an abrasive slurry applied between the tool cutting end and the material, said cutting tool means comprising, a plurality of flat rectangular slicing blades constructed for ultrasonic cutting and provided with cutting edges at one end and arranged in spaced apart side-by-side relation for cutting parallel strips of said material from a sheet, a plurality of flat mesa cutting blades constructed for ultrasonic cutting and each arranged between adjacent ones of said slicing blades and provided with a toothed cutting end recessed behind the cutting edges of said slicing blades for simultaneously cutting a plurality of spaced apart mesas on a said strip of material, and means establishing and holding said blades in alignment and in abutting relation in a pack.

3. In an ultrasonic cutting machine, cutting tool means for abrasively cutting hard material by use of high frequency vibratory impact of the tool cutting end on an abrasive slurry applied between the tool cutting end and the material, said cutting tool means comprising, a plurality of slicing blades constructed for ultrasonic cutting and each having a cutting end for cutting a strip of said material from a sheet, a plurality of mesa cutting blades constructed for ultrasonic cutting and each provided with a toothed cutting end recessed behind the cutting ends of said slicing blades for simultaneously cutting a plurality of spaced apart mesas on a said strip of material, and means holding said blades together in a bundle.

4. In an ultrasonic cutting machine, cutting tool means for abrasively cutting hard material by use of high frequency vibratory impact of the tool cutting end on an abrasive slurry applied between the tool cutting end and the material, said cutting tool means comprising, a plurality of cutter elements constructed for ultrasonic cutting and having a cutting end for severing pieces of said material from a sheet, and a plurality of mesa cutters constructed for ultrasonic cutting and each arranged between ones of said cutter elements and provided with a toothed cutting end for simultaneously cutting a plurality of spaced apart mesas on a said piece of material.

5. In an ultrasonic cutting machine, cutting tool means for abrasively cutting hard semi-conductor material by use of high frequency vibratory impact of the tool cutting end on an abrasive slurry applied between the tool cutting end and the material, said cutting tool means comprising, a plurality of flat slicing blades constructed for ultrasonic cutting and provided with rectangular cutting ends and arranged in spaced apart side-by-side relation for cutting elongated strips of said semi-conductor material from a sheet, a plurality of other flat blades constructed for ultrasonic cutting and each arranged between adjacent ones of said slicing blades and provided with teeth having cutting ends coplanar with the cutting ends of said slicing blades for simultaneously cutting a said strip of material cross-wise into parallel spaced apart pieces, and means aligning and binding said blades together in abutting relation in a pack.

6. In an ultrasonic cutting machine, cutting tool means for abrasively cutting hard material by use of high frequency vibratory impact of the tool cutting end on an abrasive slurry applied between the tool cutting end and the material, said cutting tool means comprising, a plurality of flat rectangular slicing blades constructed for ultrasonic cutting and provided with cutting edges at one end and arranged in spaced apart side-by-side relation for cutting elongated parallel strips of said material from a sheet, a plurality of other flat blades constructed for ultrasonic cutting and each arranged between adjacent ones of said slicing blades and provided with teeth having cutting edges substantially coplanar with the cutting edges of said slicing blades for simultaneously cutting a said strip of material cross-wise into pieces, and means establishing and binding said blades in alignment and in abutting relation in a pack.

7. In an ultrasonic cutting machine, cutting tool means for abrasively cutting hard material by use of high frequency vibratory impact of the tool cutting end on an abrasive slurry applied between the tool cutting end and the material, said cutting tool means comprising, a plurality of slicing blades constructed for ultrasonic cutting and each having a cutting end for cutting an elongated strip of said material from a sheet, a plurality of other blades constructed for ultrasonic cutting and each provided with teeth having cutting ends substantially coplanar with the cutting ends of said slicing blades for simultaneously cutting a said strip of material into pieces, and means binding said blades together in a bundle.

8. In an ultrasonic cutting machine, cutting tool means for abrasively cutting hard material by use of high frequency vibratory impact of the tool cutting end on an abrasive slurry applied between the tool cutting end and the material, said cutting tool means comprising, a plurality of flat slicing blades constructed for ultrasonic cutting and arranged in spaced apart relation for cutting elongated strips of said material from a sheet, a plurality of other flat blades constructed for ultrasonic cutting and each arranged between adjacent ones of said slicing blades and provided with teeth for simultaneously cutting away portions of a said strip of material along its length, and means binding said blades together in a pack.

9. In an ultrasonic cutting machine, cutting tool means for abrasively cutting hard material by use of high frequency vibratory impact of the tool cutting end on an abrasive slurry applied between the tool cutting end and the material, said cutting tool means comprising, a plurality of cutter elements constructed for ultrasonic cutting and having substantially coplanar cutting ends for severing pieces of said material simultaneously from a sheet, and a plurality of other cutters constructed for ultrasonic cutting and each provided with a toothed cutting end in substantially coplanar relation with the cutting ends of said cutter elements for simultaneously severing a said piece of material into several pieces.

References Cited by the Examiner
UNITED STATES PATENTS

| | | | |
|---|---|---|---|
| 1,897,893 | 2/33 | Evans | 18—44 |
| 2,306,732 | 12/42 | Huxham | 18—44 |
| 2,774,194 | 12/56 | Thatcher. | |
| 2,813,377 | 11/57 | Duran. | |
| 2,825,186 | 3/58 | Palush. | |
| 3,023,547 | 3/62 | Tesche. | |

LESTER M. SWINGLE, *Primary Examiner.*

FRANK E. BAILEY, *Examiner.*